US006402347B1

(12) United States Patent
Maas et al.

(10) Patent No.: US 6,402,347 B1
(45) Date of Patent: Jun. 11, 2002

(54) LIGHT GENERATOR FOR INTRODUCING LIGHT INTO A BUNDLE OF OPTICAL FIBERS

(75) Inventors: Theodorus F. M. M. Maas; Johannes P. M. Ansems; Simon H. A. Begemann, all of Eindhoven (NL)

(73) Assignee: Koninklijke Philips Electronics N.V. (NL)

( * ) Notice: Subject to any disclaimer, the term of this patent is extended or adjusted under 35 U.S.C. 154(b) by 0 days.

(21) Appl. No.: 09/464,002

(22) Filed: Dec. 15, 1999

(30) Foreign Application Priority Data

Dec. 17, 1998 (EP) .............................. 98204283
Sep. 2, 1999 (EP) .............................. 99202849

(51) Int. Cl.[7] .............................. F21V 29/00
(52) U.S. Cl. ...................... 362/294; 362/373; 362/547; 362/574; 315/312
(58) Field of Search ................. 362/554, 556, 362/555, 294, 238, 255, 558, 230, 231, 373, 547, 574; 315/169.3, 160, 312, 291, 219, 209 R

(56) References Cited

U.S. PATENT DOCUMENTS

| 4,495,378 A | * | 1/1985 | Dotzer et al. ............... 174/68.5 |
| 5,161,059 A | | 11/1992 | Swanson et al. ............ 359/565 |
| 5,301,090 A | * | 4/1994 | Hed ........................... 362/554 |
| 5,387,961 A | | 2/1995 | Kang .......................... 355/71 |
| 5,740,313 A | * | 4/1998 | Ueda et al. .................. 392/419 |
| 5,803,575 A | | 9/1998 | Ansems et al. .............. 362/32 |
| 5,803,579 A | * | 9/1998 | Turnbull et al. ........... 362/83.1 |
| 5,953,053 A | * | 9/1999 | Chen et al. .................... 348/20 |
| 5,997,150 A | * | 12/1999 | Anderson .................... 362/227 |
| 6,105,869 A | * | 8/2000 | Schaf et al. ................ 235/454 |
| 6,151,407 A | * | 11/2000 | Conlon et al. .............. 382/153 |

FOREIGN PATENT DOCUMENTS

| EP | 477036 | 3/1992 | ............ G02B/6/42 |
| EP | 596865 | 5/1994 | ............ G01S/7/48 |
| EP | 601485 | 6/1994 | ............ B41J/2/455 |
| GB | 2295274 | 5/1996 | ............ H01L/33/00 |
| WO | 9318555 | 9/1993 | ......... H01L/31/173 |
| WO | 9833007 | 7/1998 | ............ F21S/1/10 |

* cited by examiner

Primary Examiner—Sandra O'Shea
Assistant Examiner—Ali Alavi
(74) Attorney, Agent, or Firm—Dicran Halajian

(57) ABSTRACT

The light generator comprises a housing (1) with a light source in the form of a plurality of LEDs (3, 3', ... ), each having a luminous flux of at least 5 lm during operation. The housing (1) also comprises a collimating lens (6) and a Fresnel lens (8) for focusing the beam generated by the LEDs (3, 3', ... ). The light engine is further provided with drive means in a box (10) for driving the LEDs (3, 3', ... ). Preferably, the collimator lens (6) has a number of sub-lenses (7, 7', ... ), the optical axis of each of the sub-lenses coinciding with the optical axis of a respective one of the LEDs (3, 3', ...).

9 Claims, 4 Drawing Sheets

LIGHT GENERATOR FOR INTRODUCING LIGHT INTO A BUNDLE OF OPTICAL FIBERS

BACKGROUND OF THE INVENTION

The invention relates to a light generator comprising a housing accommodating a light source and an optical system for directing the radiation to be generated by the light source.

Such light generators are known per se. They are used, inter alia, for general lighting purposes, for so-called sign and contour illumination, for signal illumination, such as in traffic lights or traffic-control systems, for example in road-marking systems for dynamically or statically controlling traffic flows. Such light generators are further used in projection illumination and in fiber-optical illumination.

A light generator of the type mentioned in the opening paragraph is known from U.S. Pat. No. 5,803,575. The known light engine is provided with a light source in the form of a high-pressure metal iodide lamp. The radiation generated by this lamp is directed via an optical system in the form of a reflector and a focusing lens to the end of a bundle of optical fibers.

A drawback of the known light generator is that the light source appears to emit much heat in the form of IR-radiation during operation. Besides, a relatively large quantity of UV-radiation is generated by the known lamp. As a result, it proved to be impossible to manufacture the reflector and the focusing lens from a synthetic resin. If these components of the optical system are made of a synthetic resin material, they are found to degrade under the influence of the UV-radiation and/or melt under the influence of the IR-radiation. Consequently, the reflector and the focusing lens are usually made of glass. In comparison with synthetic resin components, optical components of glass with the dimensional accuracy desired for this application are relatively expensive.

SUMMARY OF THE INVENTION

It is an object of the invention to provide a light generator in which the components of the optical system for directing the radiation to be generated by the light source can be made of a synthetic resin material.

These and other objects are achieved by means of a light generator comprising a housing accommodating a light source and an optical system for directing the radiation to be generated by the light source, wherein
   the light source comprises at least one LED having a luminous flux which is at least 5 lm during operation of the light source,
   and the light generator is provided with drive electronics for driving the LED.

The invention is based on the recognition that light-emitting diodes (LEDs) generate much less radiation heat and/or UV light than gas discharge lamps or halogen lamps. Consequently, LEDs are eminently suitable for use in light engines. For the desired applications, such as projection illumination and fiber-optical illumination, the luminous flux of the LEDs of the light generator should be sufficiently high, namely 5 lm or more. Since the LEDs of the light engine according to the invention can be chosen to be such that they emit little or no UV and/or IR-radiation, it is now possible to manufacture the optical system of the light generator from a synthetic resin material. In this respect, good results have been achieved with optical systems of poly[methylmethacrylate] (PMMA).

It is noted that, in principle, it is possible to manufacture unicolored light generators which are provided with a single LED. In practice, a substrate with a plurality of LEDs as the light source of the light generator will be employed in many cases. This applies, in particular, if the desired color of the light generator can be obtained only by mixing the colors of different types of LEDs.

Further advantages of the use of LEDs are the compactness of such light sources, a relatively very long service life, and the relatively low costs of energy and maintenance of a light engine comprising LEDs. The use of LEDs also has the advantage that dynamic lighting possibilities are obtained. If different types of LEDs are combined and/or LEDs of different color are used, colors can be mixed in the desired manner and color changes can be effected without the use of a so-called color wheel being necessary. The desired color effects are achieved by using suitable drive electronics. In addition, a suitable combination of LEDs enables white light to be obtained, whereby drive electronics enable a desired color temperature to be adjusted, which color temperature remains constant during operation of the light generator.

LED is preferably mounted on a metal-core printed circuit board. When the LED(s) is (are) provided on such a metal-core printed circuit board (MC-PCB), the heat generated by the LED or the LEDs can be readily dissipated via the PCB by means of heat conduction.

The housing can be is made of metal and provided with cooling fins, with the metal-core printed circuit board in contact with the metal housing via a heat-conducting connection. Such a heat-conducting connection is preferably realized by mounting the MC-PCB on a metal plate which is connected to the metal housing. In this embodiment, the heat generated in the LED or LEDs can be dissipated by (thermal) conduction via the MC-PCB and the metal plate to the housing and the cooling fins, whereafter heat-dissipation to the surroundings takes place. An advantage hereof resides in that forced air cooling to dissipate heat is not necessary.

The invention is characterized in that the metal-core printed circuit board is cooled by means of forced air cooling. In this embodiment, an air stream is generated in the housing, during operation of the light engine, for example by means of a fan incorporated in the housing, which air stream is directed, for example, towards the MC-PCB. In this case, the housing may be made of a synthetic resin. It is to be noted that it is also possible to combine the measure of forced air cooling and the measures of removing heat via heat conduction, as mentioned in the previous paragraph.

A favorable embodiment of the light generator in accordance with the invention is characterized in that
   the light source comprises a plurality of LEDs,
   and in that the optical system comprises a collimator lens which is composed of a plurality of sub-lenses, an optical axis of each of the sub-lenses coinciding with an optical axis of one of the LEDs.

By means of this optical construction, the light from a number of LEDs can be satisfactorily focused. The sub-lenses of the collimator lens are preferably interconnected. In practice, the collimator lens is embodied so as to be an optically transparent plate of a synthetic resin material (for example PMMA), wherein the separate sub-lenses (one lens for each LED) are provided by means of injection molding.

An alternative, favorable embodiment of the light engine in accordance with the invention is characterized in that
   the light source comprises a plurality of LEDs,
   in that the optical system comprises a plurality of collimating elements, each LED being associated with one collimating element, and an optical axis of each one of the LEDs coinciding with an optical axis of the associated collimating element.

This measure enables the LED and the associated collimating element to be considered as one integrated element, which combination can be advantageously used, in the manufacture of the light generator, as a building block for an assembly of LEDs with associated collimating elements. It is even more advantageous to use combinations of three LEDs with three associated collimating elements as an integrated module, wherein each collimating element has a hexagonal structure enabling the collimating elements to be readily interconnected.

The light engine in accordance with the invention is characterized in that parts of the collimating preferably exhibit total internal reflection. In this manner, the light originating from the LED is emitted in a single direction by the optical system. As a result, the light output of the LED in the predetermined, specific direction is increased. Preferably, collimating elements are used which exhibit a combination of (total) internal reflection and refraction.

The invention is characterized in that the surface of the collimating elements facing away from the LEDs is preferably curved. As a result of this curvature, the dimensions of the collimating element are reduced without a reduction in functionality. By virtue thereof, a saving in costs is achieved because less material is necessary. In this manner, a compact and relatively inexpensive light engine having a high efficiency is obtained, the optical system being designed in such a manner that more light is emitted by the light engine (the light emitted is generally launched into an optical fiber).

To simplify the construction of the light engine, preferably, the LEDs and the associated collimating elements are arranged in a hexagonal assembly. By virtue thereof, the compactness and efficiency of the light engine are increased.

In a preferred embodiment of the light engine, the optical system also comprises a focusing lens. Preferably, the focusing lens of the optical system is embodied so as to be a Fresnel lens. This contributes to the compactness of the light generator. Such a Fresnel lens is preferably made of a synthetic material, for example PMMA, wherein the desired optical Fresnel structure is obtained by means of injection molding.

Drive electronics of the light engine may comprise means for changing the luminous flux of the LED. By using this measure, it is possible to dim the luminous flux. It is to be noted that the drive electronics are generally incorporated in the housing. In principle, it is also possible to arrange the drive electronics outside the housing.

Another interesting embodiment of the light generator is characterized in that the light source comprises a plurality of LEDs, in that the light source comprises LEDs which generate radiation of different wavelengths, and in that the drive electronics of the light generator comprise means for adjusting the ratio between the luminous fluxes of the LEDs.

This measure enables the color and the color temperature of the light emitted by the light generator to be changed. By using suitable drive electronics, it becomes also possible, to make, for example, while light of a constant color temperature.

These and other aspects of the invention will be apparent from and elucidated with reference to the embodiments described hereinafter.

BRIEF DESCRIPTION OF THE DRAWING

The Figures are purely diagrammatic and not drawn to scale. Particularly for clarity, some dimensions are exaggerated strongly. In the Figures, like reference numerals refer to like parts whenever possible.

DETAILED DESCRIPTION OF THE PREFERRED EMBODIMENTS

Figure 1:
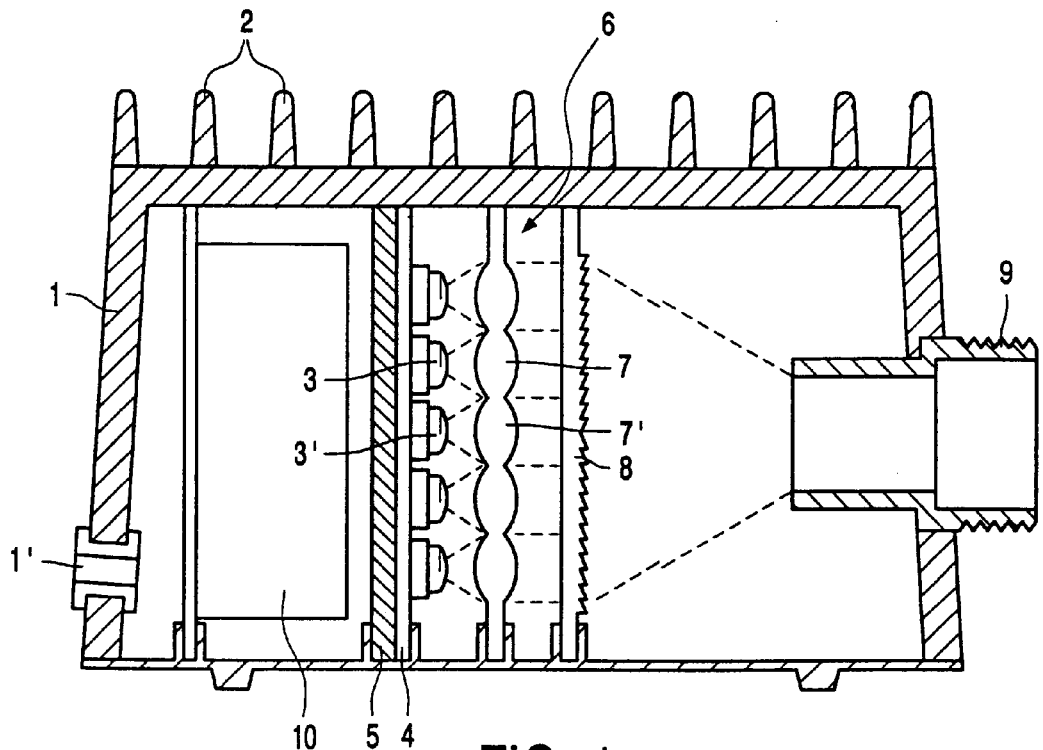
FIG. 1 is a cross-sectional view of a first embodiment of the light generator in accordance with the invention.

FIG. 1 shows a first embodiment of the light generator in accordance with the invention. This light engine comprises a metal housing 1 which is provided with metal cooling fins 2. In this case, the housing and the cooling fins were made of aluminium. The total dimensions of the housing 1 are 11 cm×9 cm×8 cm.

The housing 1 accommodates a light source in the form of twenty-one LEDs 3, 3', . . . , which are mounted on a metal-core printed circuit board (MC-PCB) 4. The MC-PCB is provided on a metal (aluminium) plate 5, for example by means of a heat-conducting adhesive. The metal plate 5 is in heat-conducting contact with the housing 1. Due to this construction, the heat generated by the LEDs 3, 3', . . . can be dissipated to the surroundings via the MC-PCB 4, the metal plate 5 and the housing 1 with the cooling fins 2.

Red and green "high-efficiency, high-output" LEDs of the "Barracuda" type (Hewlett Packard) are used. The luminous flux per LED is 10 lm for the red LEDs and 13 lm for the green LEDs. The use of these "high-efficiency, high-output" LEDs has the specific advantage that the number of LEDs may be relatively small for a desired, relatively high light output. This contributes to the compactness and efficiency of the light generators to be manufactured.

In an alternative embodiment, "Prometheus" type LEDs (Hewlett-Packard) are used as the "high-efficiency, high-output" LEDs, the luminous flux per LED being 35 lm for red LEDs and 30 lm for green LEDs.

The housing 1 also comprises an optical system for directing the radiation generated by the LEDs 3, 3'. . . In the example of FIG. 1, this optical system comprises a collimator lens 6 which consists of twenty-one sub-lenses 7, 7', . . . molded in an optically transparent synthetic resin (PMMA). Each of the twenty-one sub-lenses 7, 7', . . . is associated with one of the twenty-one LEDs 3, 3', . . . and collimates the radiation of the relevant LED. The optical system also comprises a focusing lens 8 which is embodied so as to be a (positive) Fresnel lens in this preferred embodiment. By means of the focusing lens 8, collimated radiation from the LEDs 3, 3', . . . is directed towards one point by the sub-lenses 7, 7', . . . For the sake of clarity, the radiation path through the optical system of the light generated by the LEDs 3, 3', . . . is shown very diagrammatically.

The housing 1 also comprises a coupling sleeve 9 on which a fiber or a number of fibers can be detachably connected. It is emphasized that the present invention is not limited to this application. The aperture 1' serves to allow passage of an electrical connection cable.

The housing 1 is also provided with drive electronics required for driving the LEDs. In the present case, the drive electronics are incorporated in a box 10 in the housing. It is to be noted that, if desired, the drive electronics may be alternatively outside the housing.

Figure 2:
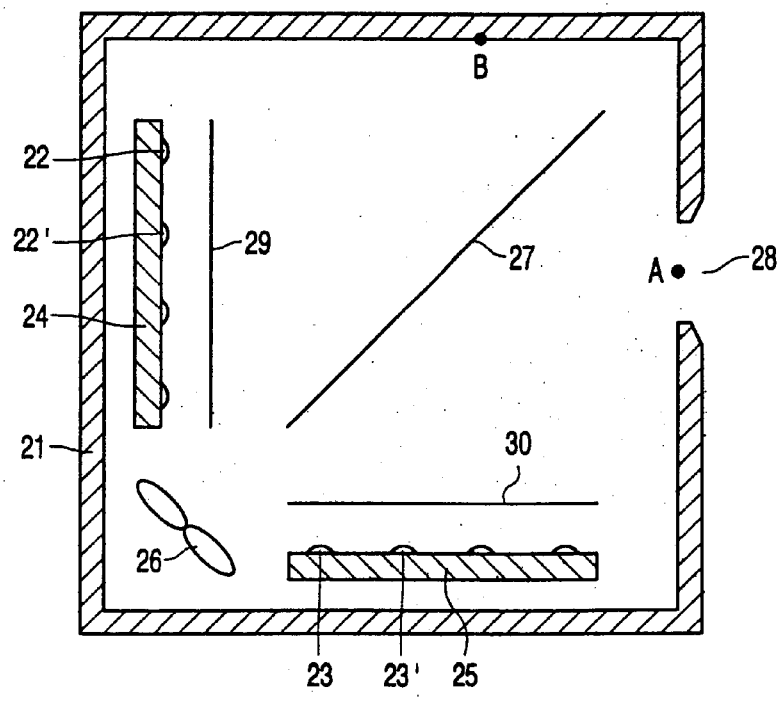
FIG. 2 is a cross-sectional view of a second embodiment of the light generator in accordance with the invention.

FIG. 2 is a diagrammatic, sectional view of a second embodiment of the light generator in accordance with the invention. This embodiment comprises a housing 21 of a synthetic resin material (for example polypropene) accommodating to light sources implemented in the form of a first series of sixteen LEDs 22, 22', . . . and a second series of sixteen LEDs 23, 23'. . . Also in this embodiment, use is made of "high-efficiency, high-output" LEDs. Radiation having a wavelength of approximately 630 nm (red light) can be generated with this first series of LEDs 22, 22', . . . , while radiation having a wavelength of approximately 530 nm (green light) can be generated with the second series of LEDs 23, 23', The first series of LEDs 22, 22', . . . is arranged on a first MC-PCB 24, while the second series of LEDs 23, 23', . . . is arranged on a second MC-PCB 25, the normal to the surfaces of both MC-PCBs extending at right angles. Both printed circuit boards are secured to a wall of the housing 21 in a manner which is not shown in detail. Both MC-PCBs 24, 25 may be cooled by means of forced air cooling. To this end, a stream of air can be generated in the housing 21 by a fan 26. To ensure a satisfactory supply and removal of such an air stream, the housing is provided with ventilation holes (not shown in FIG. 2).

The housing 21 is also provided with a so-called dichroic mirror 27. This mirror is arranged at an angle of 45° with respect to the normal of both MC-PCBs. This mirror is of such a type that it is transparent to red light but reflects green light. The red and green light is guided towards the exit 28 by said positioning of the LEDs 22, 22', . . . ; 23, 23', . . . and the dichroic mirror 27.

The above-described construction comprising the dichroic mirror 27 may be alternatively used for combining colors of substantially the same wavelength (for example of approximately 630 nm and approximately 610 nm). In this way, an increase of the flux can be obtained in an efficient manner. If desired, also blue light may be guided towards exit 28 by means of a second dichroic mirror (not shown) and a third series of blue LEDs (not shown either), so that white light can also be generated.

The light generator as shown in FIG. 2, also comprises two optical systems 29, 30, with which the light beam of each LED is focused at one point. The radiation generated by the LEDs 22, 22', . . . mounted on MC-PCB 24 is focused at point A, while the radiation generated by the LEDs 23, 23', . . . of MC-PCB 25 (in the absence of mirror 27) is focused at point B.

The light generator also comprises drive electronics (not shown in FIG. 2), for driving the LEDs 22, 22', . . . ; 23, 23', . . . In this case, the drive electronics include means for mutually changing the luminous flux of mutually different LEDs 22, 22', . . . ; 23, 23', . . . By virtue thereof, the ultimate color of the light issuing from the housing can be adjusted between red and green.

In a third embodiment, the optical system comprises a plurality of collimating elements, with each LED being associated with one collimating element, and an optical axis of each one of the LEDs coinciding with an optical axis of the associated collimating element.

Figure 3:
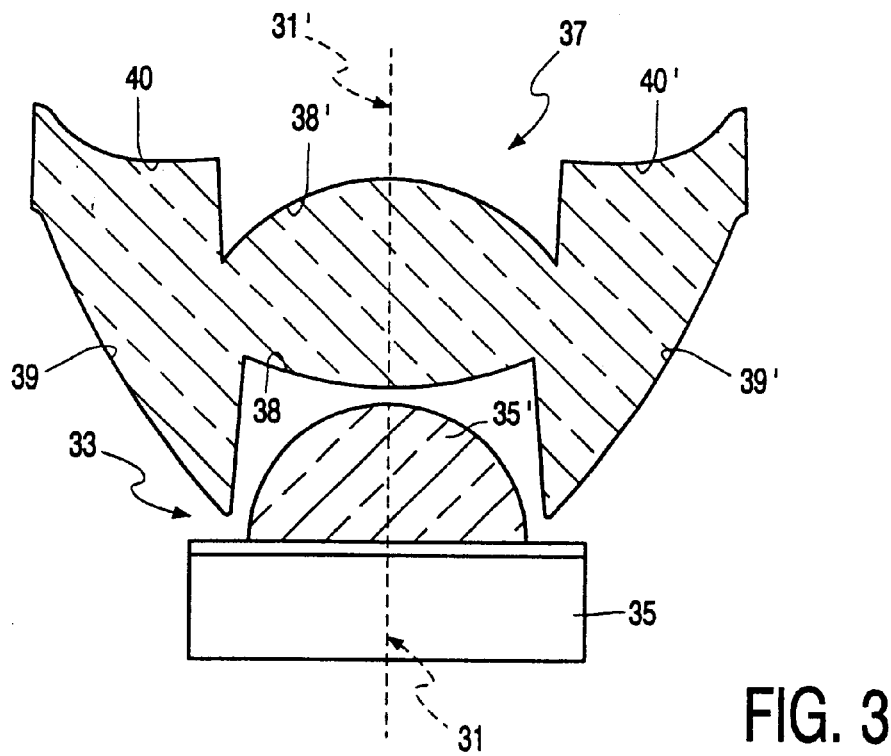
FIG. 3 shows a LED with an embodiment of a collimating element associated with the LED in cross-section.

FIG. 3 is a cross-sectional view of a LED 33 with an embodiment of a collimating element 37 associated with said LED 33. The LED 33 has an optical axis 31 and is composed of a body 35 for emitting light during operation. In the example of FIG. 3, the body 35 of the LED 33 is provided with a transparent envelope 35', for example in the form of a lens. The collimating element 37 has an optical axis 31 ' which coincides with the optical axis 31 of the LED 33. The shape of the collimating element 37 is chosen to be such that light originating from the LED 33 is emitted by the optical system in a direction parallel to the optical axis 31' of the collimating element. Due to this measure, the intensity of the LED 33 is increased in the forward direction (parallel to the optical axis 31). To this end, surfaces 38, 38' of the collimating element 37 are curved such that light originating from the LED 33 and impinging on the surface 38 forms a parallel light beam after passing the surface 38', which light beam extends parallel to the optical axis 31 ' of the collimating element 37 (refraction). Further, surfaces 39; 39' and associated surfaces 40; 40' of the collimating element 37 are curved such that light originating from the LED 33 and impinging on the surface 39; 39' is fully reflected in the direction of the surface 40, 40' and, after passing surface 40; 40', forms a parallel light beam extending parallel to the optical axis 31' of the collimating element 37 (total internal reflection).

Figure 5:
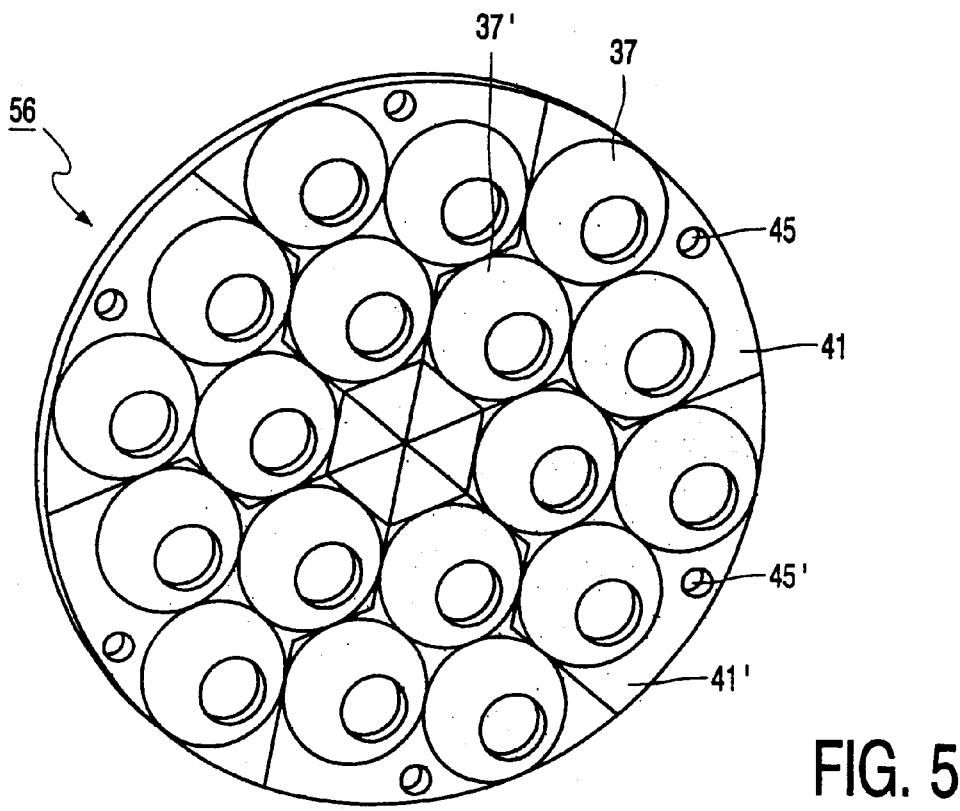
FIG. 5 is a perspective, side view of an embodiment of an assembly of eighteen collimating elements as shown in FIG. 3.
Figure 4A:
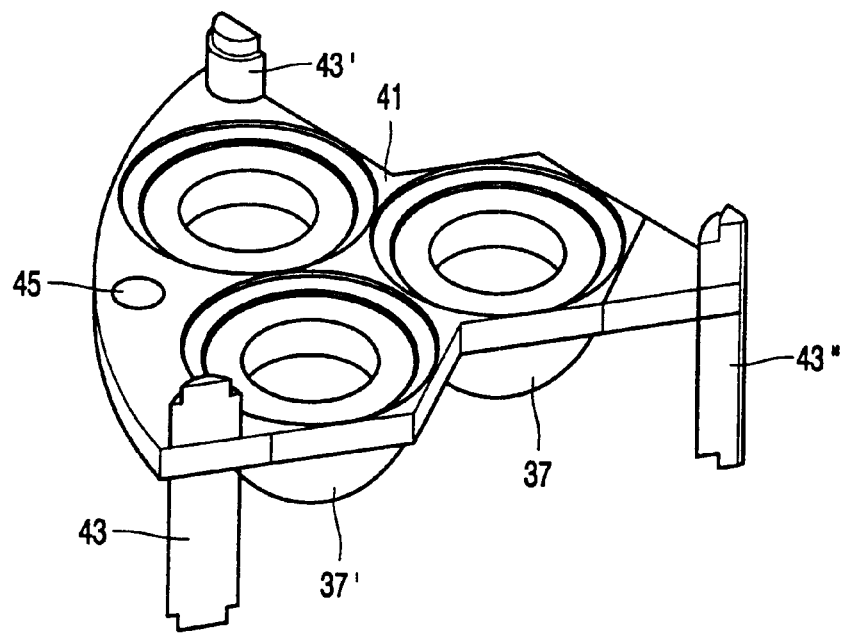
FIGS. 4A and 4B are a perspective plan view and a perspective bottom view, respectively, of an assembly of three collimating elements as shown in FIG. 3.
Figure 4B:
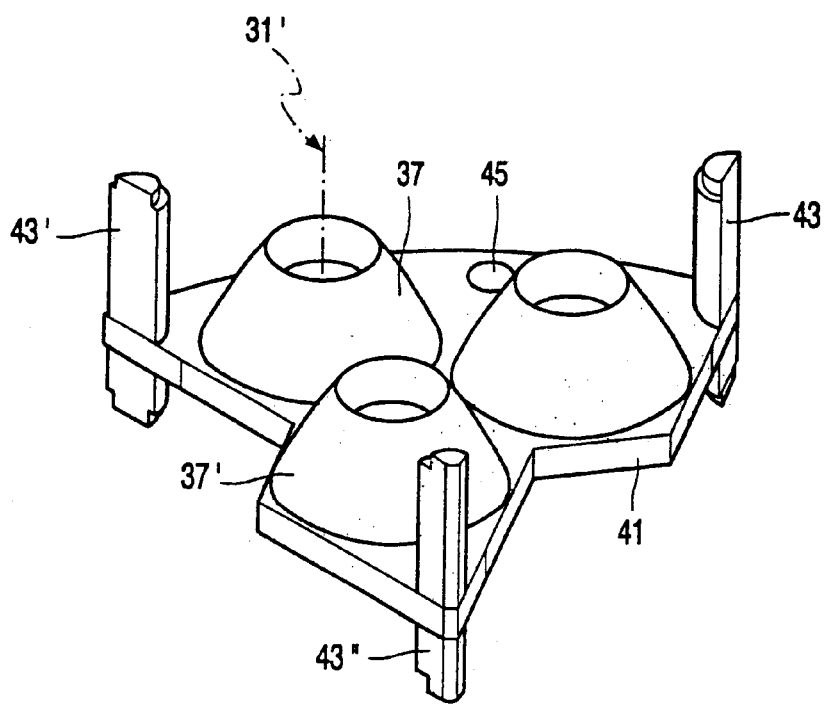

FIGS. 4A and 4B are a perspective plan view and a perspective bottom view, respectively, of an assembly of three collimating elements 37, 37', . . . , as shown in FIG. 3. For clarity, the optical axis 31' of the collimating element 37 is shown in FIG. 4B. The collimating elements 37, 37', . . . are embedded in a substrate 41 which is provided with connection elements 43, 43', 43" for coupling a number of such substrates 41. The substrate 41 is shaped such that the collimating elements 37, 37', . . . are hexagonally arranged, and that six such substrates 41 can be readily combined so as to form a hexagonal structure as shown in FIG. 5. In this combination, six connection elements 43" form the center of the hexagonal structure of FIG. 5. To mount the substrate in the housing 61 (see FIG. 6), the substrate is provided with a screw opening 45.

FIG. 5 shows, in perspective, a side view of an embodiment of an assembly 56 of eighteen collimating elements 37, 37', . . . , as shown in FIG. 3, six substrates 41, 41' as shown in FIGS. 4A and 4B, being combined. For clarity, the connection elements are not shown in FIG. 5. Collimating elements 37, 37', . . . are mounted in substrates 41, 41', . . . which are combined in such a manner that the collimating elements 37, 37', . . . are arranged in accordance with a hexagonal structure. To mount the substrates 41, 41', . . . in the housing 61 (see FIG. 6), the substrates 41, 41', . . . are provided with screw openings 45, 45', . . .

It is to be noted that, for clarity, the LEDs in the FIGS. 4A, 4B and 5 are omitted. In the example of FIG. 5, there is no collimating element in the middle position of the assembly 56. If desired, an additional LED and a collimating element associated therewith may be provided, so that light is also incident into the fiber(s) in a direction parallel to the optical axis.

Figure 6:
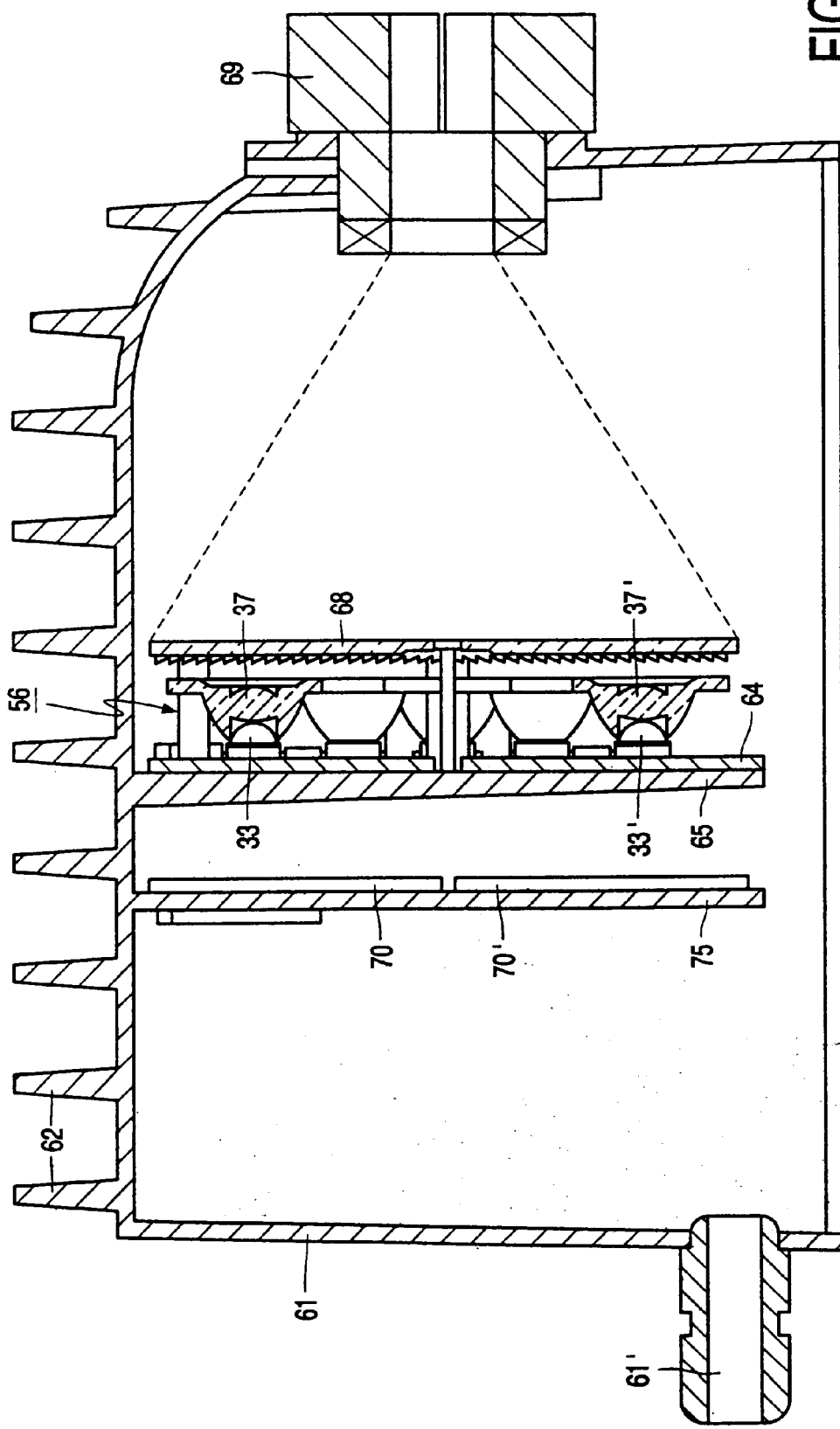
FIG. 6 is a third embodiment of the light generator in accordance with the invention, the assembly of eighteen collimating elements as shown in FIG. 5 being provided in the light engine.

FIG. 6 diagrammatically shows the assembly 56 of eighteen collimating elements 37, 37', . . . , as shown in FIG. 5, which are provided in a light engine, which assembly constitutes a third embodiment of the light engine in accordance with the invention. The light engine comprises a (metal) housing 61 provided with (metal) cooling fins 62. The overall dimensions of the housing are 11 cm×10 cm×10 cm.

The housing 61 accommodates a light source in the form of eighteen LEDs 33, 33', which are mounted on a metal-core printed circuit board (MC-PCB) 64. Said MC-PCB 64 is provided on a (metal) plate 65 for example by means of a heat-conducting adhesive. The plate 65 is a part of the housing 61 and is in heat-conducting contact therewith. This construction enables the heat generated by the LEDs 33, 33', . . . to be dissipated to the surroundings via the MC-PCB 64, the metal plate 65 and the housing 61 with the cooling fin 62.

Red and green "Prometheus-type (Hewlett-Packard) high-efficiency, high-output LEDs are employed, the luminous flux being 35 lm per LED for the red LEDs and 30 lm for the green LEDs. The use of high-efficiency, high-output LEDs has the specific advantage that the number of LEDs can be relatively small for a desired, relatively high light output. This contributes to the compactness and efficiency of the light engine to be manufactured.

The housing 61 further comprises an optical system for directing the radiation generated by the LEDs 33, 33', . . . In the example shown in FIG. 6, this optical system comprises an assembly 56 of eighteen collimating elements 37, 37', . . . , as shown in FIG. 5. Each of the collimating elements 37, 37', . . . is made from an optically transparent synthetic resin (PMMA) which is injection molded into a shape as shown in FIG. 3. Each of the eighteen collimating elements 37, 37', . . . is associated with one of the eighteen LEDs 33, 33', . . . , and collimates the radiation from the LED. The optical system also comprises a focusing lens 68 which, in this preferred embodiment, is embodied so as to be a (positive) Fresnel lens. By means of a focusing lens 68, the radiation from the LEDs 33, 33', . . . collimated by the collimating elements 37, 37', . . . is directed at one point. For clarity, the radiation path of the light generated by the LED 33, 33', . . . through the optical system is shown very diagrammatically.

The housing 61 is further provided with a coupling sleeve 69 wherein a fiber or a number of fibers can be detachably secured. It is emphasized that the present invention is not limited to this application. The opening 61' serves for passing an electrical connection cable.

The housing 61 is further provided with drive electronics 70, 70' which are necessary to drive the LEDs 33, 33'. . . In this case, a part of the drive electronics 70, 70' are provided on a (metal) plate 75 which forms part of the housing 61. A further part of the drive electronics may also be situated in the empty space in the housing 61 between the metal plate 75 and the opening 61'. If desired, the drive electronics may also be situated outside the housing 61.

In summary, it is noted that the light generator in accordance with the invention comprises a housing accommodating at least one LED as a light source having a luminous flux which is at least 5 lm during operation, and an optical system for directing the radiation to be generated by the light source, while the light engine is provided with drive electronics for driving the LEDs. Such a light generator generates much less radiation heat and/or UV-light during operation than light generators provided with a gas discharge lamp or a halogen lamp. Parts of the optical system in the light generator in accordance with the invention may consequently be made of a synthetic resin material such as, for example, PMMA.

It will be obvious that, within the scope of the invention, many variations are possible to those skilled in the art. For example, instead of light-emitting diodes (LEDs) opto-electronic elements, also referred to as electro-optical elements, for example electro-luminescent elements, may generally be used as the light source.

The scope of protection of the invention is not limited to the examples given hereinabove. The invention is embodied in each new characteristic and each combination of characteristics. Reference numerals in the claims do not limit the scope of protection thereof. The use of the word "comprising" does not exclude the presence of elements other than those mentioned in the claims. The use of the word "a" or "an" before an element does not exclude the presence of a plurality of such elements.

What is claimed is:

1. A light generator comprising a housing accommodating a light source and an optical system for directing the radiation to be generated by the light source, wherein the light source comprises at least one LED having a luminous flux which is at least 5 lm during operation of the light source;

the optical system comprises a collimating system for incident light from the light source, said collimating system including collimator elements which exhibit total internal reflection of a portion of said light; said optical system further comprising a focusing lens to focus within the housing, light incident from the collimating system;

the housing is provided with cooling fins; and the light generator further comprises drive electronics for driving the LED and a metal-core printed circuit board on which the LED is mounted.

2. A light generator as claimed in claim 1, wherein the housing is made of metal, and the metal-core printed circuit board is in contact with the metal housing via a heat-conducting connection.

3. A light generator as claimed in claim 1, further comprising means for forced air cooling the metal-core printed circuit board.

4. A light generator as claimed in claim 1, wherein the light source comprises a plurality of LED's, and the collimator system comprises a collimator lens which is composed of a plurality of sub-lenses, each of the sub-lenses having an optical axis which coincides with an optical axis of a respective one of the LED's.

5. A light generator as claimed in claim 1, wherein the light source comprises a plurality of LED's, and the optical system comprises a plurality of said collimating elements, each LED being associated with one collimating element, and an optical axis of each one of the LED's coinciding with an optical axis of the associated collimating element.

6. A light generator as claimed in claim 5, wherein the LED's and the associated collimating elements are arranged in a hexagonal array.

7. A light generator as claimed in claim 1, wherein the focusing lens is a Fresnel lens.

8. A light generator as claimed in claim 1, wherein the drive electronics comprise means for changing the luminous flux of the LED.

9. A light generator as claimed in claim 1, wherein the light source comprises LED's which generate radiation of different wavelengths, and the drive electronics comprise means for adjusting the ratio between the luminous fluxes of the LED's.

* * * * *